United States Patent
Stahlberg

[15] 3,678,785
[45] July 25, 1972

[54] FOUR SPEED RATIO POWER TRANSMISSION MECHANISM FOR AUTOMOTIVE VEHICLES

[72] Inventor: Hans J. Stahlberg, Ahornweg, Germany
[73] Assignee: Ford Motor Company, Dearborn, Mich.
[22] Filed: April 19, 1971
[21] Appl. No.: 135,258

[30] Foreign Application Priority Data

May 14, 1970 Germany.....................P 20 23 639.9

[52] U.S. Cl..................................................................74/759
[51] Int. Cl.......................................................F16h 57/10
[58] Field of Search.....................................................74/759

[56] References Cited

UNITED STATES PATENTS 2,806,388   9/1957   Simpson ...............................74/759

Primary Examiner—Carlton R. Croyle
Assistant Examiner—Thomas C. Perry
Attorney—John R. Faulkner and Donald J. Harrington

[57] ABSTRACT

A four-speed ratio power transmission mechanism adapted to be used in an automotive vehicle driveline comprising a Simpson type planetary gear system and a simple planetary gear unit situated between the low speed ratio reaction element of the Simpson gear system and the power output shaft whereby the torque multiplication achieved during low speed ratio operation is augmented to provide an increased low torque ratio, the elements of the additional simple planetary gear unit and the elements of the Simpson gear system having a large degree of interchangeability, wherein a minimum number of clutch and brake control members are required and the manufacturing cost penalty due to the additional torque multiplication ratio is slight.

2 Claims, 9 Drawing Figures

INVENTOR:
Hans J. Stahlberg.
BY:
ATTORNEYS.

3,678,785

FOUR SPEED RATIO POWER TRANSMISSION MECHANISM FOR AUTOMOTIVE VEHICLES

GENERAL DESCRIPTION OF THE INVENTION

This invention comprises a hydrokinetic power transmission mechanism for use in motor vehicles having three simple planetary gear units and fluid pressure operated clutches and brakes for controlling the relative motion of the elements of the gear unit to establish four forward-driving speed rations and either one reverse ratio or two reverse ratios. Two of the three simple planetary gear units have characteristics that resemble the well-known Simpson gear system presently used in drivelines of some contemporary vehicles. The third simple planetary gear unit has elements that cooperate structurally and functionally with the elements of the Simpson portion of the gear system to produce four forward driving speed ratios and a pair of reverse ratios, although only one additional brake is required.

It is possible to emPloy an automatic power transmission mechanism with two or three forward driving speed ratios in a driveline having relatively high torque engines. In those instances the engine itself is used to overcome the inherent lack of performance in the transmission since the engine is large enough to provide excess torque capacity which may be called upon when added vehicle performance is required It is an object of this invention, however, to provide a transmission system that will be feasible for use in a driveline with a low torque engine where economy is a more important design criterion.

It is possible to achieve the necessarY vehicle performance with a low torque engine by using a transmission having an additional forward driving ratio, such as a transmission with four forward driving ratios. Known four speed ratio transmission which would be acceptable for this purpose, however, increase the cost of the driveline substantially because of the additional number of friction clutches and brakes that are required to control the relative motion of the gear elements. It is an object of the invention, therefore, to provide a transmission system for a low torque engine having four forward driving ratios without substantially increasing the cost. This object is achieved by providing a maximum degree of interchangeability of elements of the four-speed ratio gear system.

In elements of a conventional three-speed ratio gear system of the Simpson type the instant gear unit may be made of components that are common to the so-called three-speed Simpson gearing arrangement. It is also possible to enjoy the economies that are inherent in high volume manufacturing operation since three-speed transmission as well as four-speed transmissions may be made with the same tooling investment.

The selection of the numbers of the teeth of the individual gear units is dependent primarily upon the performance requirements of the vehicle in which the transmission is to be installed although the epicylic gear units in the transmission may have the same number of teeth without upsetting the optimum spacing between ratios that is required for optimum performance of the vehicle with a low torque engine.

PARTICULAR DESCRIPTION OF THE INVENTION

Figure 1:
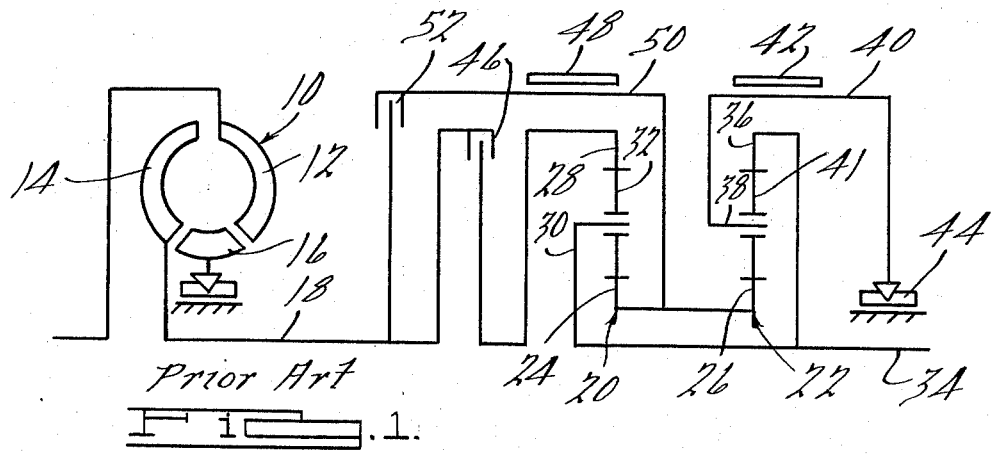
FIG. 1 shown a prior art three-speed power transmission mechanism with a hydrokinetic torque converter, the mechanical section of the transmission consisting of one of the two possible types of Simpson units.

FIG. 1 shows a prior art gear arrangement having so-called Simpson gearing. It includes a hydrokinetic torque converter 10 having an impeller 12 connected drivably to the crankshaft 12 of an internal combustion engine for a vehicle driveline. The converter 10 includes also a bladed turbine 14 and a bladed stator 16 situated in toroidal fluid-flow relationship with respect to the impeller 12. The turbine 14 is connected drivably to turbine shaft 18.

The transmission of FIG. 1 includes a pair of simple planetary gear units 20 and 22. Gear units 20 and 22 have sun gears 24 and 26, respectively, which may be connected together or which may be formed from a single sun gear element.

Gear unit 20 includes ring gear 28, carrier 30 and planet pinions 32 journalled on the carrier 30 in meshing engagement with the sun gear 24 and the ring gear 28. Carrier 30 is connected drivably to power output shaft 34.

Gear unit 22 includes ring gear 36 which is connected directly to output shaft 34. It includes also a carrier 38 on which is journalled planet pinions 41. Carrier 38 is connected to brake drum 40 about which is positioned friction brake band 42. Drum 40 is braked also by overrunning coupling 44 which distributes forward driving torque reaction to the transmission housing during operation in the lowest speed ratio. The coupling 44 complements the action of the brake band 42, the latter being effective to provide reaction torque distribution to the housing in either direction.

Turbine shaft 18 is connected during forward drive operation to ring gear 28 through forward drive clutch 46. When clutch 46 is engaged, turbine torque is delivered to the ring gear 28, thereby producing reverse reaction torque on sun gears 24 and 26. A forward driving torque then is distributed to the carrier 30 and the output shaft 34.

The reaction torque on sun gear 24 is reversed and transmitted to the output shaft 34 as ring gear 36 is driven in a forward driving direction. The reaction torque for the gear unit 22 is distributed to the housing through overrunning coupling 44.

Intermediate speed ratio operation is obtained by applying brake band 48, which surrounds brake drum 50. This anchors the common sun gears 24 and 22, thereby causing carrier 30 and output shaft 34 to be driven at an increased speed ratio as overrunning coupling 44 freewheels.

Third speed ratio, direct-drive operation is achieved by releasing brake band 48 and applying high speed clutch 52 which connects the turbine shaft 18 to the drum 50. With both clutches applied and both brakes released, the gearing assumes a 1:1 drive ratio.

Reverse drive is obtained by releasing forward drive clutch 46 and applying clutch 52 and brake 52. Turbine torque then is delivered directly to the sun gear 26. With the carrier 38 acting as a reaction member, ring gear 36 and the output shaft 34 are driven in a reverse direction.

Figure 2:
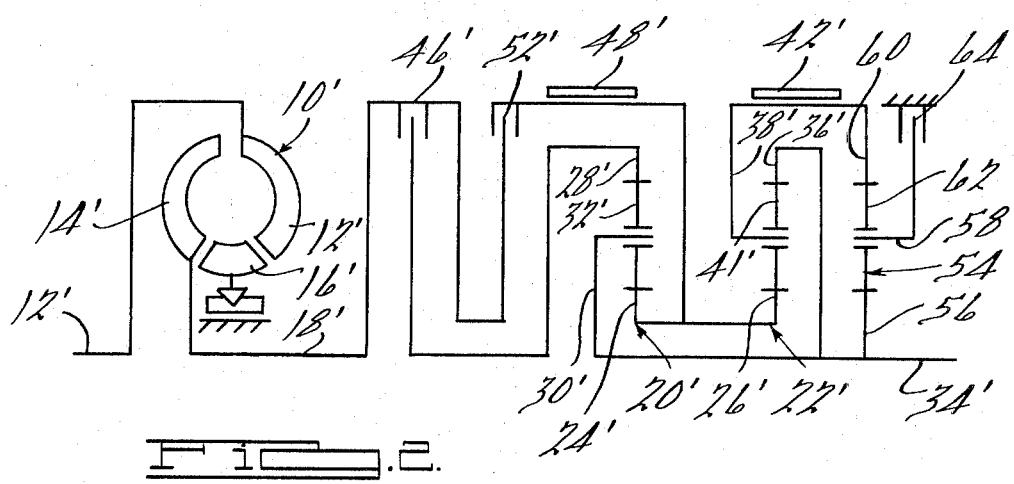
FIG. 2 shows a diagram of a four-speed transmission in accordance with the invention.

FIG. 2 embodies some of the characteristics of the construction of FIG. 1. For this reason the elements of FIG. 2 having counterpart elements in the construction of FIG. 1 have been designated by similar reference characters although prime notations are added.

The construction of FIG. 2 includes a third simple planetary gear unit 54 in addition to planetary gear units 20' and 22'. Gear unit 54 includes sun gear 56, carrier 58, ring gear 60 and planet pinions 62 journalled on the carrier 58 in meshing engagement with ring gear 60 and sun gear 56. A selectively engageable brake 64 anchors the carrier 58.

Figure 4:
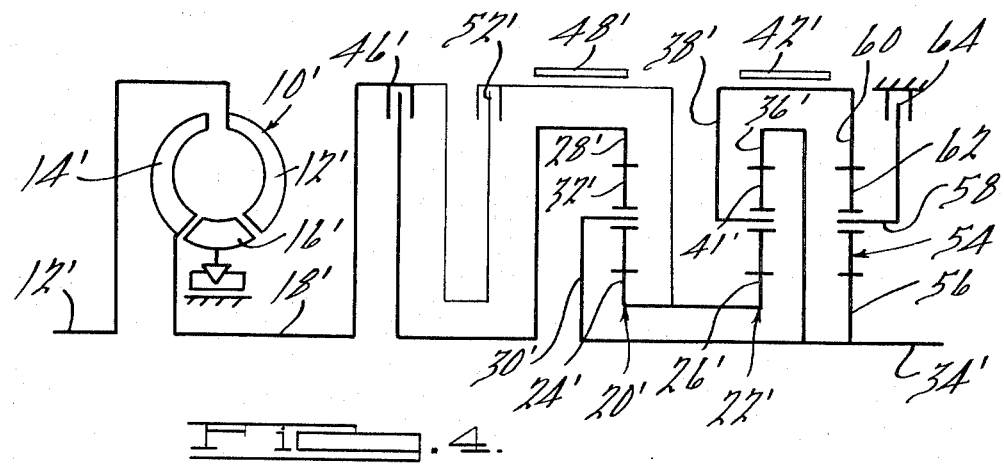
FIGS. 4, 5, 6 and 7 show the various power flow paths for the transmission system of FIG. 2 during operation in the first, second, third, and fourth forward-driving speed ratios.

The lowest speed ratio in the embodiment of FIG. 2 is achieved by applying brake 64. Under these circumstances the reaction torque on the carrier 38' is delivered to the output shaft 34' through the gear unit 54 instead of being delivered to the housing as in the FIG. 1 embodiment. The reaction torque for the gear unit 54 is distributed directly to the housing to engage brake 64. The torque flow path during operation in the first speed ratio is illustrated schematically in FIG. 4. The gear unit 54 thus cooperates structurally and functionally with each of the other gear units 20 and 22 to produce a torque distribution pattern not capable of being achieved by the usual Simpson gearing arrangement, thereby providing a feasible low speed ratio for high speed engines without adversely affecting the ratio spacing required for comparable performance at the higher speed ratios.

The magnitude of the highest torque ratio may be calculated by the following equation where the symbol "Z" with subscript numerals designates the numbers of teeth in the FIG. 2 gearing arrangement for the gear elements having corresponding symbols.

$$T = \frac{Z_1}{Z_3}\left[\left(1+\frac{Z_6}{Z_4}\right)+\left(\frac{Z_7}{Z_9}\right)\times\left(\frac{Z_4+Z_6}{Z_4}\right)\right]+1$$

Figure 5:
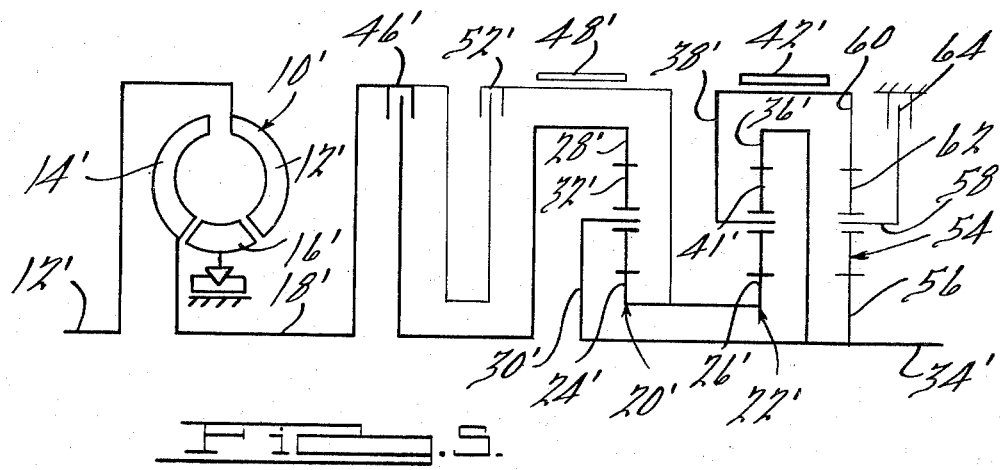
Figure 6:
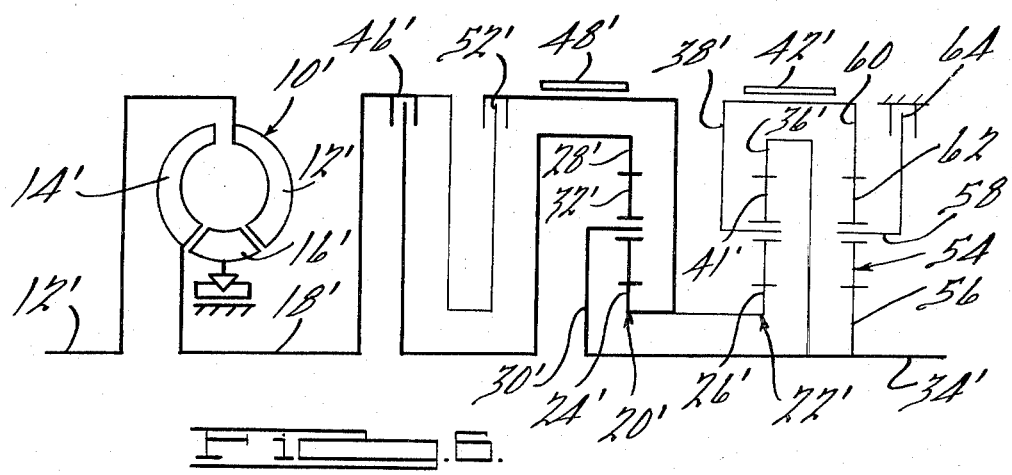
Figure 7:
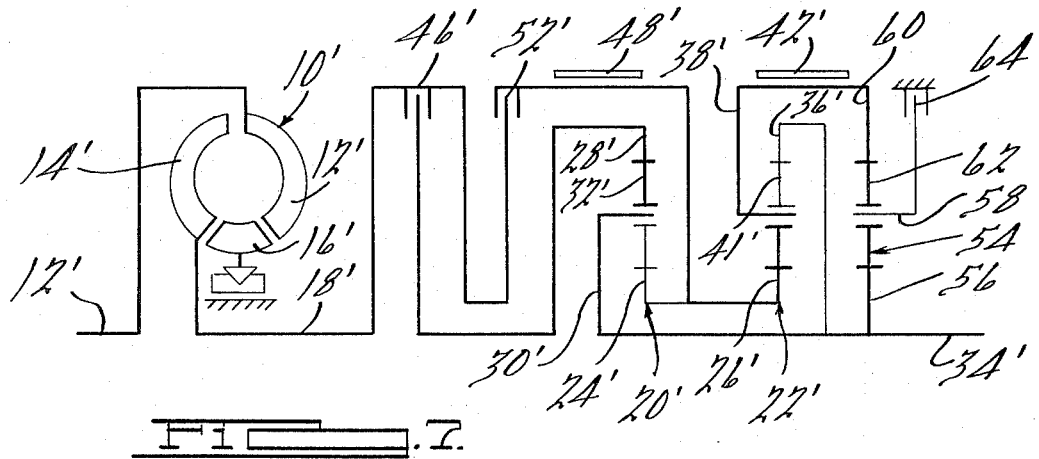
Figure 8:
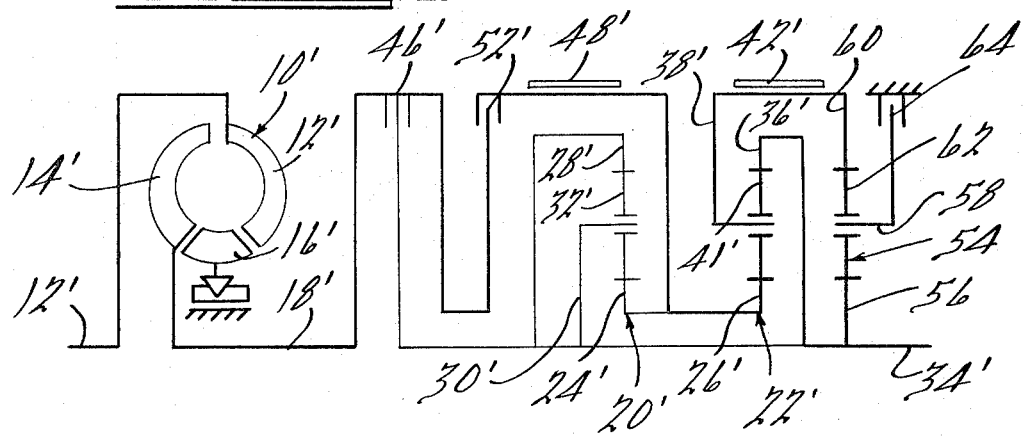
FIG. 8 and 9 show the torque flow path for the gear system of FIG. 2 during operation in each of two reverse drive ratios.

FIG. 5, 6 and 7 indicate the torque delivery paths that are established during second speed ratio operation, third speed ratio operation and fourth speed ratio operation, respectively. Second speed ratio operation is achieved by applying brake band 42' which anchors the carrier 38'. Brake 64 is released with the carrier 38' acting as a reaction member and with turbine torque being delivered to the ring gear 28' through the engaged clutch 46'.

Third speed ratio operation is achieved by applying brake band 48' and releasing band 42'. Clutch 52' and brake 64' are disengaged.

Fourth speed ratio operation is achieved by applying simultaneously clutches 52' and 46'.

Figure 9:
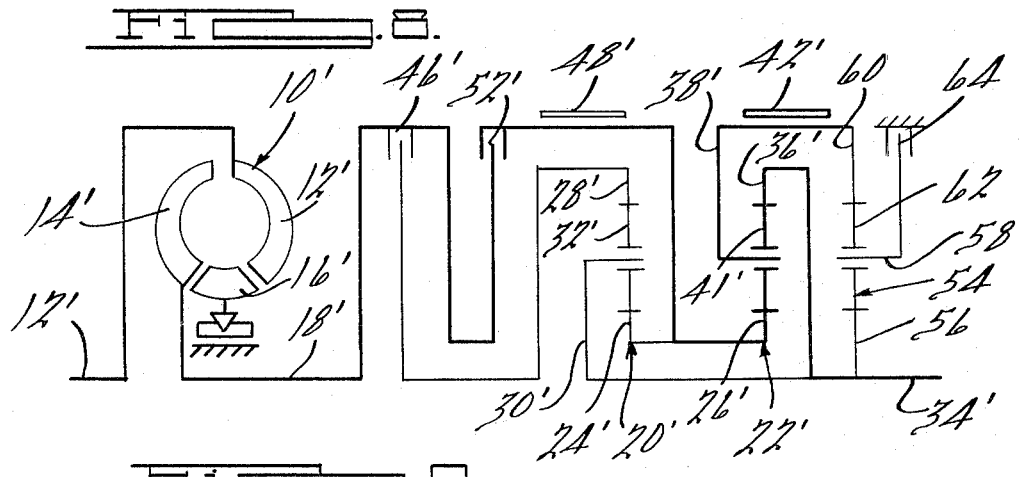

Two reverse drive ratios are available depending upon whether the brake 64 is applied or released. During the reverse drive operation clutch 52 is applied and clutch 46 is released. Turbine torque then is delivered directly to the sun gears. If brake band 42 is applied, ring gear 36 and the output shaft 34 are driven in a reverse direction. This condition is shown in the schematic view of FIG. 9. The reduction ratio in these circumstances is determined by the equation $T_{RII} = -Z_6/Z_7$. If a higher torque ratio in reverse is desired, brake 64 is applied thereby causing the torque ratio to change in accordance with the following equation:

$$T_{RI} = -\left(\frac{Z_3}{Z_1}+\frac{Z_1}{Z_3}+1\right)$$

The corresponding equations for the ratios in each of the four forward driving speed ratios are represented by the following equations:

First speed ratio:

$$T_I = \frac{Z_1}{Z_3}\left[\left(1+\frac{Z_6}{Z_4}\right)+\left(\frac{Z_7}{Z_9}\right)\times\left(\frac{Z_4+Z_6}{Z_4}\right)\right]+1$$

Second speed ratio:

$$T_{II} = 1 + \frac{Z_1}{Z_3}\left(1+\frac{Z_6}{Z_4}\right)$$

Third speed ratio:

$$T_{III} = 1 + \frac{Z_1}{Z_3}$$

Figure 3:
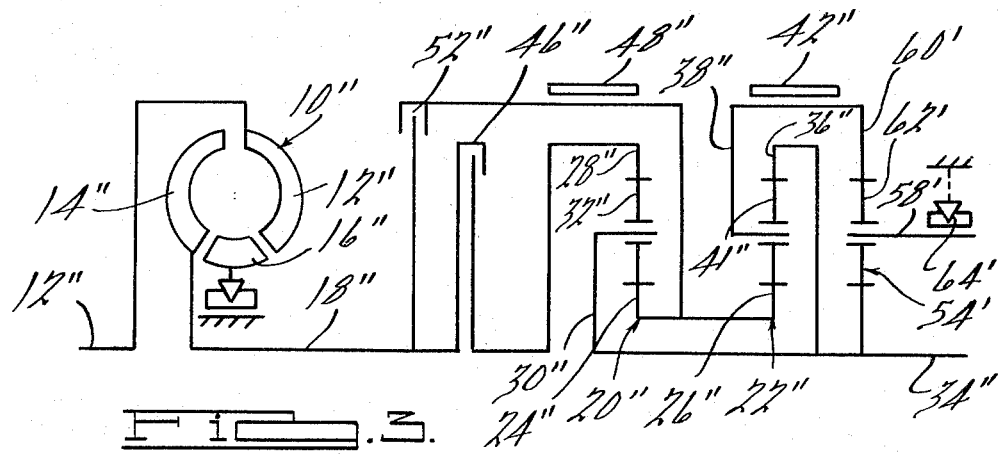
FIG. 3 shows a modified form of four-speed transmission mechanisms embodying the improvements of the invention.

The embodiment of FIG. 3 is the same as the embodiment of FIG. 2 except that an overrunning brake is used rather than a friction brake on the rearmost carrier. The elements of the FIG. 3 construction that have counterpart elements in the FIG. 2 construction have been designated by similar reference characters although double prime notations are added.

Having thus described the principal features of our invention, what we claim and desire to secure by U.S. Letters Patent is:

1. A hydromechanical power transmission mechanism for an automotive vehicle adapted to deliver driving torque from a driving member to a driven member comprising three simple planetary gear units, each gear unit having a ring gear, a sun gear, a carrier and planet gears journalled on said carrier in meshing engagement with said sun and ring gears, forward drive clutch means for connecting the driving member to the ring gear of a first of said gear units, second clutch means for connecting the driving member to the sun gear of said first and second gear units during third speed ratio operation, brake means for anchoring the sun gears of said first and second gear units during third speed ratio operation, the sun gears of said first and second gear units being connected together for rotation in unison, the carrier of said first gear unit being connected to said driven member, the ring gear of said second gear unit being connected to said driven member, the carrier of said second gear unit being connected to the ring gear of the third gear unit, the sun gear of the third gear unit being connected to said driven member, brake means for selectively anchoring the carrier of said third gear unit during low speed ratio operation, and third brake means for anchoring the carrier of said second gear unit during second speed ratio operation.

2. A hydromechanical power transmission mechanism for an automotive vehicle adapted to deliver driving torque from a driving member to a driven member comprising three simple planetary gear units, each gear unit having a ring gear, a sun gear, a carrier and planet gears journalled on said carrier in meshing engagement with said sun and ring gears, forward drive clutch means for connecting the driving member to the ring gear of a first of said gear units, second clutch means for connecting the driving member to the sun gear of said first and second gear units during fourth speed ratio operation, brake means for anchoring the sun gears of said first and second gear units during third sped ratio operation, the sun gears of said first and second gear units being connected together for rotation in unison, the carrier of said first gear unit being connected to said driven member, the ring gear of said second gear unit being connected to said driven member, the carrier of said second gear unit being connected to the ring gear of the third gear unit, the sun gear of the third gear unit being connected to said driven member, second brake means for selectively anchoring the carrier of said third gear unit during low speed ratio operation, and third brake means for anchoring the carrier of said second gear unit during second speed ratio operation, said forward clutch means being released and said second clutch means being applied during operation in a first reverse drive ratio as the carrier for the second gear unit is anchored by said third brake means, the carrier of said third gear unit being anchored by said second brake means as said second clutch means is applied to establish a second reverse drive ratio operation.

* * * * *